(12) United States Patent
Onishi

(10) Patent No.: US 10,677,938 B2
(45) Date of Patent: Jun. 9, 2020

(54) RADIATION DETECTION DEVICE, RADIATION INSPECTION SYSTEM, AND METHOD FOR ADJUSTING RADIATION DETECTION DEVICE

(71) Applicant: HAMAMATSU PHOTONICS K.K., Hamamatsu-shi, Shizuoka (JP)

(72) Inventor: Tatsuya Onishi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 56 days.

(21) Appl. No.: 16/062,369

(22) PCT Filed: Dec. 8, 2016

(86) PCT No.: PCT/JP2016/086585
§ 371 (c)(1),
(2) Date: Jun. 14, 2018

(87) PCT Pub. No.: WO2017/110507
PCT Pub. Date: Jun. 29, 2017

(65) Prior Publication Data
US 2018/0364370 A1 Dec. 20, 2018

(30) Foreign Application Priority Data
Dec. 21, 2015 (JP) .................................. 2015-248650

(51) Int. Cl.
*G01T 1/20* (2006.01)
*G01N 23/04* (2018.01)
(Continued)

(52) U.S. Cl.
CPC ........... *G01T 1/2002* (2013.01); *G01N 23/04* (2013.01); *G01N 23/083* (2013.01); *G01T 1/2018* (2013.01); *G01T 1/244* (2013.01)

(58) Field of Classification Search
None
See application file for complete search history.

(56) References Cited

U.S. PATENT DOCUMENTS 3,827,072 A  7/1974 Bevis et al.
4,189,645 A  2/1980 Chaney et al.
(Continued)

FOREIGN PATENT DOCUMENTS

CN  102971643 A  3/2013
CN  107076685 A  8/2017
(Continued)

OTHER PUBLICATIONS

International Preliminary Report on Patentability dated Jul. 5, 2018 for PCT/JP2016/086585.

*Primary Examiner* — Hoon K Song
(74) *Attorney, Agent, or Firm* — Faegre Drinker Biddle & Reath LLP

(57) ABSTRACT

An X-ray detection device is a device detecting X-rays having transmitted through a test subject, and comprises a filter member including a filter that attenuates some of X-rays, a detector that detects the X-rays partially attenuated by the filter, and a housing that places the detector therein. The housing includes a principal surface including a slit capable of going through the X-rays, and a side surface including an opening which extends in the direction orthogonal to the principal surface and through which the filter can be inserted. The filter of the filter member is disposed in the housing so as to cover a line sensor of the detector and a scintillator in a state of being apart from the detector.

17 Claims, 15 Drawing Sheets

(51) Int. Cl.
*G01N 23/083* (2018.01)
*G01T 1/24* (2006.01)

(56) References Cited

U.S. PATENT DOCUMENTS

| | | | |
|---|---|---|---|
| 4,975,590 A | 12/1990 | Tanaka | |
| 2007/0133739 A1* | 6/2007 | Hangartner | .......... A61B 6/4035 378/54 |
| 2015/0179391 A1 | 6/2015 | Ikeda et al. | |

FOREIGN PATENT DOCUMENTS

| | | |
|---|---|---|
| EP | 0449113 A2 | 10/1991 |
| EP | 2352014 A1 | 8/2011 |
| JP | H6-094899 A | 4/1994 |
| JP | H06-94900 A | 4/1994 |
| JP | H8-033596 B2 | 3/1996 |
| JP | 2001-311704 A | 11/2001 |
| JP | 2002-168803 A | 6/2002 |
| JP | 2008-170347 A | 7/2008 |
| JP | 2010-122103 A | 6/2010 |
| JP | 2011-64643 A | 3/2011 |
| JP | 2013-156172 A | 8/2013 |
| JP | 2013-253887 A | 12/2013 |
| JP | 2014-139555 A | 7/2014 |
| JP | 2015-121563 A | 7/2015 |

* cited by examiner

RADIATION DETECTION DEVICE, RADIATION INSPECTION SYSTEM, AND METHOD FOR ADJUSTING RADIATION DETECTION DEVICE

TECHNICAL FIELD

The present invention relates to a radiation detection device, a radiation inspection system, and a method for adjusting a radiation detection device.

BACKGROUND ART

It is widely practiced that a test subject, such as a food or a pharmaceutical product, is irradiated with X-rays, and inspected for presence or absence of a foreign matter in the subject from a transmitted X-ray image thereof. An X-ray detection device that includes a line sensor for detecting a transmission image by X-rays emitted from an X-ray source toward the subject is used for the inspection. The X-ray detection device adopts, for example, a configuration where two line sensors are arranged in parallel in such a way as to detect X-rays in different energy ranges, in a case where foreign matters to be detected are different (for example, whether the foreign matter is a piece of bone or metal included in meat) (for example, see Patent Literature 1). In the X-ray detection device described in Patent Literature 1, a radiation quality variable body is provided on one sensor to vary the radiation qualities of the X-rays to reach the line sensors.

CITATION LIST

Patent Literature

Patent Literature 1: Japanese Unexamined Patent Publication No. 2002-168803

SUMMARY OF INVENTION

Technical Problem

In the X-ray detection device capable of detecting different foreign matters as described above, it is preferable that the device can flexibly change the detection sensitivity to detect X-rays in various energy ranges in conformity with usage in consideration of the S/N ratio. In a case of change, a scintillator is changed or a filter is added to perform adjustment. However, it is difficult to replace the scintillator every time adjustment is performed. When the filter is replaced, the configuration of disposing the filter on the upper surface of the scintillator as in Patent Literature 1 possibly scratches the filter during adjustment. On the other hand, in a case where the filter is disposed to cover a slit provided on the upper surface of a metal box that houses an X-ray sensor, there are possibilities of changing the camera height in conformity with the filter type (thickness), and it is required to consider these possibilities when designing of the entire radiation inspection system. Accordingly, designing is difficult.

The present invention has been made in view of such problems, and has an object to provide a radiation detection device that can easily change the detection sensitivity to any of various energy bands without changing the height of the radiation detection device every time filter adjustment is performed, a radiation inspection system that includes the radiation detection device, and a method for adjusting the radiation detection device.

Solution to Problem

A radiation detection device according to an aspect of the present invention is a radiation detection device for detecting radiation which is irradiated to a test subject from a radiation source and is transmitted through the test subject. The radiation detection device comprises: a filter member having a filter that attenuates at least a part of the incident radiation; a detector that detects the radiation with at least a part thereof having been attenuated by the filter; and a housing that places the detector therein. In this radiation detection device, the housing comprises a principal surface including a part through which the radiation passes, and a side surface including an opening extending in a direction intersecting with the principal surface and allowing the filter to be inserted therethrough. The filter is disposed in the housing so as to cover at least a part of the detector in a state of being apart from the detector.

In the radiation detection device, the opening into which the filter can be inserted is provided on the side surface of the housing that places the detector therein, and the filter is disposed in the housing of the filter so that the filter can cover at least a part of the detector in the state of being apart from the detector. In this case, the filter that changes (attenuates) the radiation quality of the incident radiation is configured to be disposed inside the housing of the radiation detection device. The configuration negates the need to change the height of the radiation detection device every time filter adjustment is performed, and the detection sensitivities can be changed to various energy bands. In addition, the filter is disposed in the housing so as to be apart from the detector. Consequently, when the filter is replaced with a filter having another attenuation function, the possibility that the filter comes into contact with and scratches the detector (e.g., scintillator etc.) can be reduced. Furthermore, according to the radiation detection device, the filter and the detector can be disposed to be close to each other. Consequently, occurrence of artifacts can be suppressed.

In the radiation detection device described above, the opening of the housing may have a larger area than the end surface of the filter. Accordingly, the filter can be easily inserted into the housing. Consequently, the detection sensitivity of the radiation detection device can be easily changed to various energy bands.

In the radiation detection device described above, the filter member may comprise a holding member that holds the filter, and the holding member may be made of a material transmitting radiation more than the filter. In this case, the filter can be securely disposed in a predetermined position by the holding member, and prevention of appropriate radiation detection due to attenuation of incident radiation by the holding member can be suppressed.

In the radiation detection device described above, the filter member may comprise a stopper having a larger surface area than the opening, and the stopper may be attached to the side surface of the housing. In this case, the filter of the filter member can be more securely disposed at the predetermined position.

In the radiation detection device described above, the filter member has a substantially rectangular external shape in plan view, and the filter may be disposed in a side region thereof. In this case, the filter can be disposed at an appropriate position with respect to the detector typically disposed around the center of the device.

The radiation detection device described above may further comprise a positioning member that positions the filter member in the housing so that the filter can cover a predetermined region of the detector. In this case, even if the detector is formed to have a minute configuration, the filter can be further securely disposed in an appropriate position with respect to the detector. The positioning member may be in contact with the entire or a part of the side of the filter member to position the filter.

In the radiation detection device described above, the detector may comprises: a first line sensor in which pixels having a first pixel width are one-dimensionally arranged; and a second line sensor in which pixels having a second pixel width are one dimensionally arranged and which is disposed in parallel to the first line sensor with an interval narrower than the first and second pixel widths. In this case, the radiation detection device can be further reduced in size, and the radiation in different energy ranges can be detected.

In the radiation detection device described above, the detector may further comprise a first scintillator disposed above the first line sensor, and a second scintillator disposed above the second line sensor. The filter may cover one of the first and second line sensors, or the filter may cover both the first and second line sensors, and include a first region covering the first line sensor, and a second region covering the second line sensor, and the thickness of the first region and the thickness of the second region may be identical to or different from each other.

In the radiation detection device described above, the first line sensor and the second line sensor are direct conversion type radiation detectors. In this case, there is no need to provide the scintillator separately, thereby allowing the number of components to be reduced.

In the radiation detection device described above, the distance between the filter and the detector may range from 0.1 to 10 mm, inclusive. In this case, occurrence of artifacts can be further suppressed.

In the radiation detection device described above, the principal surface of the housing may further include a slit through which the radiation entering the housing can go. The radiation detection device may further comprise a light shield film that covers the slit. In this case, attenuation of the radiation entering the detection device can be suppressed, and foreign matters (powder, dust, etc.) can be prevented from entering the inside of the housing.

The present invention relates to a radiation inspection system as another aspect, this radiation inspection system comprises: a radiation source irradiating the test subject with radiation; any one of the radiation detection devices described above; and a conveyer machine conveying the test subject in a direction intersecting with a radiation direction of the radiation by the radiation source. As described above, the inspection system is not required to change the height of the radiation detection device every time filter adjustment is performed, and the type of filter that attenuates radiation can be easily replaced. Consequently, the detection sensitivity can be easily changed to various energy bands, and various types of test subjects can be inspected.

The present invention relates to a method for adjusting any one of the radiation detection devices described above as still another aspect, this adjustment method comprises: preparing members including a plurality of filters having different attenuation functions, as the filter member; sequentially inserting the plurality of filters through the opening of the housing into an inside, holding the filter at a predetermined position, and detecting the radiation; and selecting an optimal filter member among the filters according to results of the detected radiation. In this case, the optimal filter can be easily selected from among the filters having different attenuation functions. Consequently, the method for adjusting the radiation detection device can be easily performed, and the detection sensitivity in the radiation detection device can be easily changed to various energy bands. In the present invention, as for the radiation detection device adjusted by the adjustment method, the radiation detection device may be manufactured by the method that further comprises inserting the optimal filter member selected by the selecting into the inside through the opening of the housing, and holding and fixing the filter member at a predetermined position. Such a manufacturing method can easily manufacture the radiation detection device that can easily change the detection sensitivity to various energy bands.

The present invention relates to an aspect of the invention of a filter usable for such an adjustment method, as yet another aspect. The filter member has a substantially rectangular external shape in plan view, and comprises: a filter that attenuates at least a part of the radiation; and a holding member made of a material transmitting more radiation than the filter, and holding the filter, wherein the filter is disposed in the side region of the filter member. According to such a filter member having the simple configuration, filter members having more various attenuation functions can be easily prepared, and the filter adjustment in the radiation detection device described above can be more easily performed.

Advantageous Effects of Invention

The present invention can easily change the detection sensitivity to any of various energy bands without changing the height of the radiation detection device every time the filter is changed.

BRIEF DESCRIPTION OF DRAWINGS

FIG. 7 FIGS. 7(a) and 7(b) are sectional views schematically showing an X-ray detection device according to a fifth embodiment.

DESCRIPTION OF EMBODIMENTS

Hereinafter, referring to the accompanying drawings, preferred embodiments of the present invention are described in detail. In the description, the same signs are used for the same elements or elements having the same functions, and redundant description is omitted.

Figure 1:
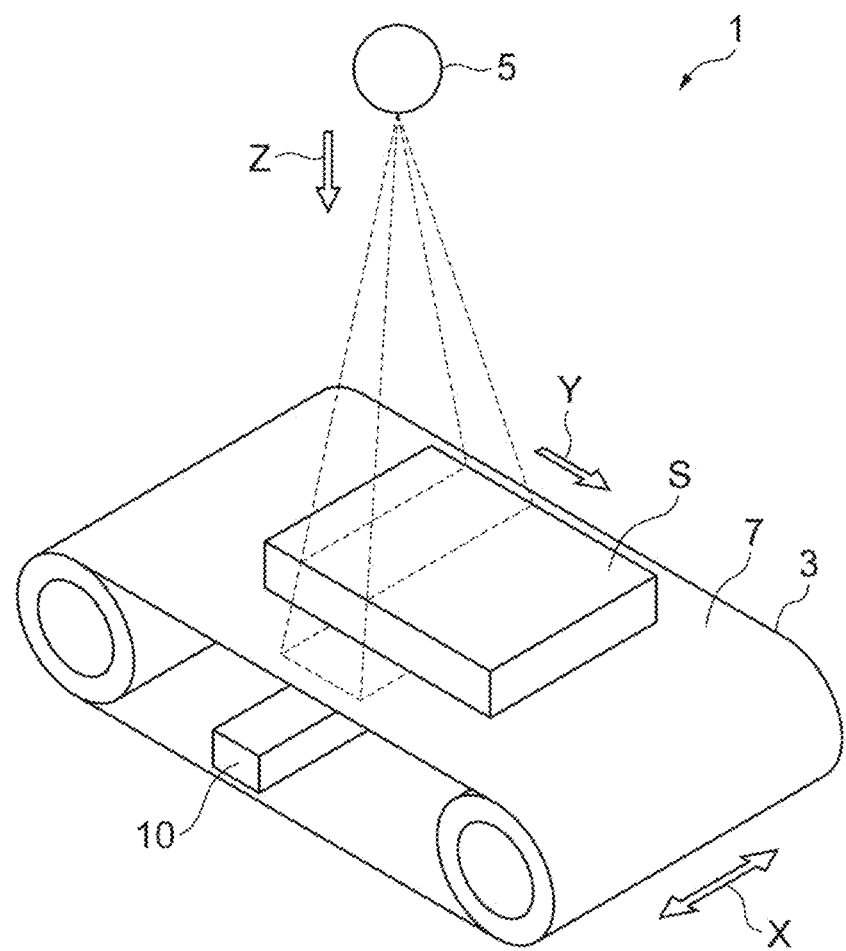
FIG. 1 is a perspective view schematically showing an X-ray inspection system according to this embodiment.
Figure 2:
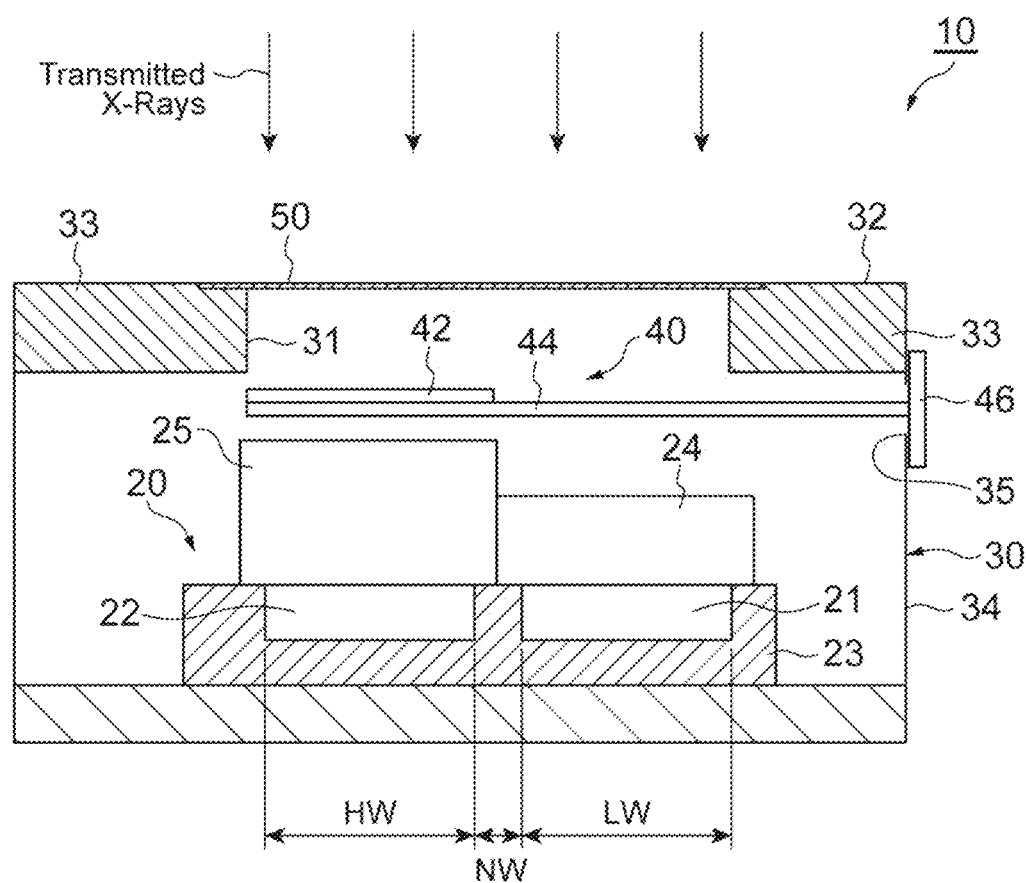
FIG. 2 is a sectional view schematically showing an X-ray detection device according to a first embodiment.

FIG. 1 is a perspective view schematically showing an X-ray inspection system according to this embodiment. FIG. 2 is a sectional view schematically showing the X-ray detection device according to this embodiment. As shown in FIG. 1, an X-ray inspection system 1 (radiation inspection system) includes a belt conveyer 3 (conveyer machine), an X-ray irradiator 5 (radiation source), and an X-ray detection device 10 (radiation detection device). The X-ray inspection system 1 emits X-rays from the X-ray irradiator 5 in an irradiation direction Z to irradiate a test subject S, and detects transmitted X-rays having transmitted through the test subject S among the irradiation X-rays in a plurality of energy ranges. The X-ray inspection system 1 performs a foreign matter test, a baggage inspection and the like using an image by the transmitted X-rays. The test subjects S by the X-ray inspection system 1 widely include, for example, foods, such as meat and retort foods, rubber products, such as tires, baggage to be baggage-inspected, resin products, metal products, such as wire, resource materials, such as minerals, waste to be segregated or resource-collected, electronic components and the like. Furthermore, there are various foreign matters to be detected in the test subject S. Accordingly, it is preferable that the X-ray inspection system 1 can flexibly change the detection sensitivity of each X-ray detection device 10 according to the physical property of the test subject S and the type of the foreign matter to be detected.

The belt conveyer 3 includes a belt unit 7 on which the test subject S is to be mounted. The belt conveyer 3 moves the belt unit 7 in a conveyance direction Y, thereby conveying the test subject S in the conveyance direction Y at a predetermined speed.

The X-ray irradiator 5 (radiation source) is a device that emits X-rays in the irradiation direction Z toward the test subject S and is, for example, an X-ray source. The X-ray irradiator 5 is, for example, a point light source, and performs irradiation of diffusing X-rays in a predetermined angle range in a detection direction X perpendicular to the irradiation direction Z and the conveyance direction Y. The X-ray irradiator 5 is disposed above the belt unit 7 apart by a predetermined distance from the belt unit 7 so that the X-ray irradiation direction Z can be oriented toward the belt unit 7, and the diffused X-rays can cover the substantially entire test subject S in the width direction (detection direction X). The X-ray irradiator 5 is configured such that in the longitudinal direction (conveyance direction Y) of the test subject S, a predetermined dividing range in the longitudinal direction is adopted as an irradiation range for one time, and the test subject S is conveyed by the belt conveyer 3 in the conveyance direction Y, thereby allowing the entire test subject S in the longitudinal direction to be irradiated with X-rays.

The X-ray detection device 10 (radiation detector) is a device that detects X-rays having been emitted from the X-ray irradiator 5 toward the test subject S and having transmitted through the test subject S, and is an X-ray detection camera, for example. The X-ray detection device 10 is disposed, for example, below the belt unit 7 to be disposed downstream of the test subject S in the radiation direction by the X-ray irradiator 5, for detecting the X-rays having transmitted through the test subject S. As shown in FIG. 2, which is a sectional view taken along the shorter side direction, such a X-ray detection device 10 includes a detector 20 that detects transmitted X-rays, a housing 30 that places the detector 20 therein, and a filter member 40 that includes a filter 42 that is inserted from its side into the housing 30 and attenuates some of the X-rays having transmitted through the test subject S. The filter 42 is disposed to cover a part of the detector 20 in a state of being apart from the detector 20.

The detector 20 includes two line sensors 21 and 22, a substrate 23, and two scintillators 24 and 25, and detects the X-rays having been emitted from the X-ray irradiator 5 and having transmitted through the test subject S (the X-rays incident on the detection device) in different energy ranges. The line sensors 21 and 22 are formed adjacent to each other in the substrate 23, which is made of silicon. The line sensor 21 is a linear sensor where pixels having a pixel width LW are one-dimensionally arranged (the direction orthogonal to the sheet of FIG. 2; the X-direction in FIG. 1). The line sensor 22 is a linear sensor where pixels having a pixel width HW are one-dimensionally arranged. The line sensor 22 is disposed in such a way as to be arranged in parallel to the line sensor 21 at an interval NW that is narrower than the pixel widths LW and HW. The pixel widths LW and HW may be the same widths, for example, each about 0.6 mm, or may be different widths. The interval NW between the sensors may be about 0.2 mm, for example. A scintillator 24 for low energy is disposed on the line sensor 21. A scintillator 25 for high energy is disposed on the line sensor 22. In the example of FIG. 2, for example, the scintillators 24 and 25 are made of different materials or have different thicknesses, and can detect X-rays in different energy bands by means thereof.

The housing 30 includes a principal surface 32 having a slit 31 for allowing X-rays to pass therethrough, and shield members 33 made of lead (Pb) or the like, on a side to be irradiated with X-rays, and houses the detector 20 therein in such a way as to be disposed in a region that corresponds to the slit 31 and allows X-rays to be passed therethrough. A main body portion of the housing 30 other than the shield members 33 is made of aluminum, for example. A light shield film 50 may be provided on the slit 31 to achieve a configuration of preventing particles and the like from entering the inside of the housing 30. The light shield film 50 may have a performance of attenuating some of the X-rays having transmitted through the test subject S. The housing 30 has a side surface 34 that extends in the direction orthogonal to the principal surface 32. On the side surface 34, an opening 35 having an area larger than the end surface of the filter 42 is formed to allow the filter 42 and the like of the filter member 40 to be inserted therethrough.

The filter member 40 is a sheet-shaped member whose external shape in plan view is substantially rectangular, for example, and includes: the filter 42 that attenuates some of the X-rays (incident radiation) having transmitted through the test subject S; a sheet-shaped holding member 44 that holds the filter 42; and a stopper 46 for attaching the end of the holding member 44 to the side surface 34 of the housing 30 so that the filter 42 can be disposed at a predetermined position in the housing 30.

Figure 3:
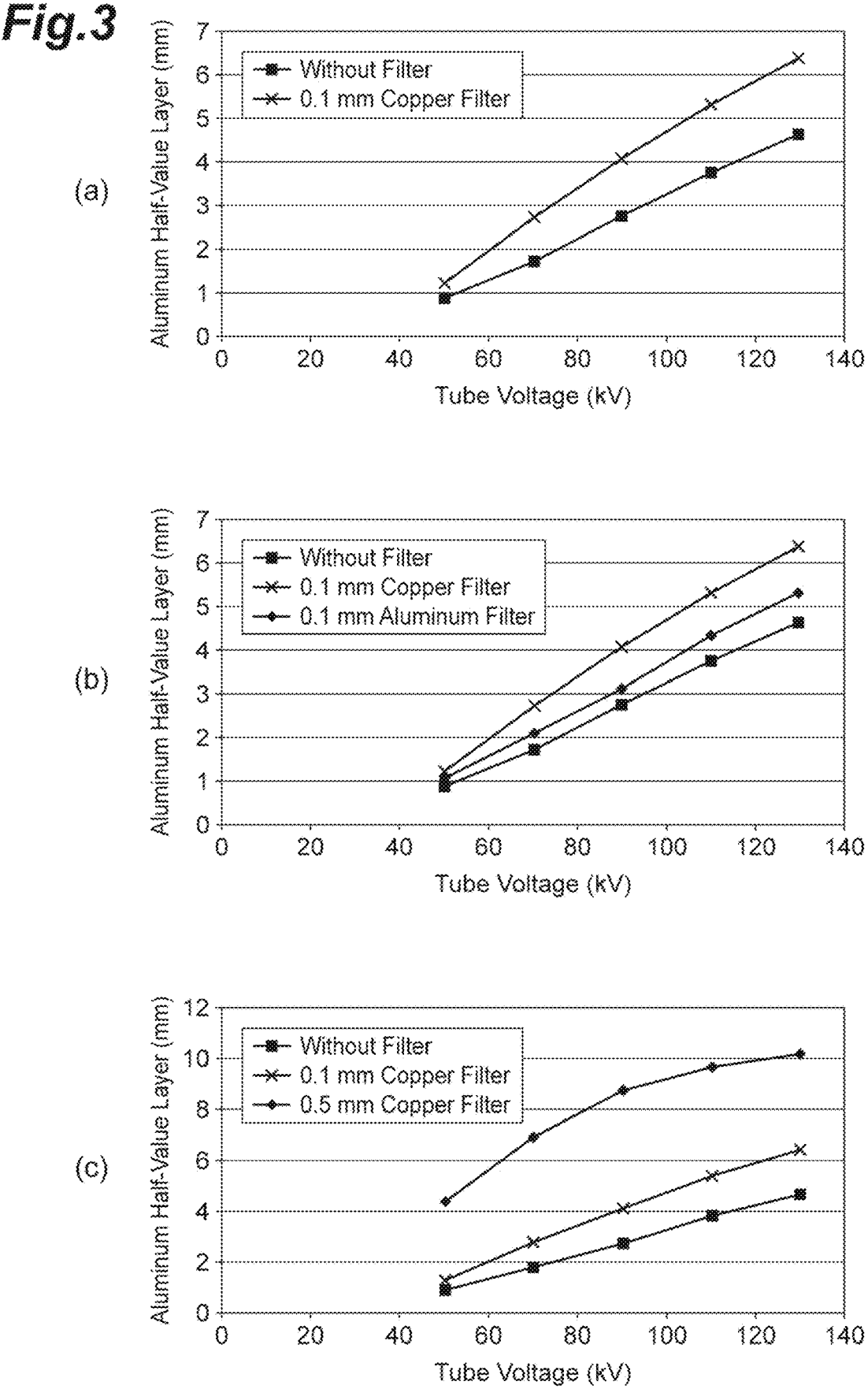
FIG. 3 is tables showing the relationship between the half-value layer and the tube voltage in cases of using copper and aluminum as filters, (a) shows comparison between a case with no filter and a case of using 0.1 mm thickness copper as a filter, (b) shows comparison between a case with no filter, a case of using 0.1 mm thickness copper as a filter, and a case of using 0.1 mm thickness aluminum as a filter, and (c) shows comparison between a case with no filter, a case of using 0.1 mm thickness copper as a filter, and a case of using 0.5 mm thickness copper as a filter.

The filter 42 is a member that is formed of a material different from that of the test subject S to have a thin plate shape. The filter 42 is made of, for example: a resin, such as polystyrene, polyethylene, polyurethane, polypropylene, Teflon®, ABS resin, AS resin, acrylic, polyamide, PET, GF-PET, PBT, polycarbonate, PPS, PTFE, PSF, or PI; carbon fiber material, such as amorphous carbon, or graphite; or metal, such as beryllium, aluminum, titanium, iron, zinc, molybdenum, tin, gold, silver, copper, platinum, lead, tantalum, gadolinium, holmium, or ytterbium. The material of the filter 42 is appropriately selected from among the aforementioned materials and the like according to a desired attenuation, i.e., the energy difference of the X-rays received by both the line sensors, and the S/N ratio. For example, it is preferable that the material be selected from copper and aluminum. Copper and aluminum have an X-ray shielding performance and are easily processed. Consequently, adjustment of the filter thickness is facilitated by selecting such a material. FIGS. 3(a) to 3(c) show the relationship between the tube voltage (kV) and half-value layer (mm) in a case of using copper (thicknesses 0.1 and 0.5 mm), aluminum (0.1 mm), etc. as the filter 42, for example. The half-value layer is the thickness of a material in a case where the amount of radiation is halved by absorption with a specific material being disposed in an X-ray flux, and is an index used to evaluate the X-ray energy characteristics. More specifically, in a case where the half-value layer is thick, the energy becomes high.

The holding member 44 is a sheet-shaped member for holding the filter 42 at a predetermined position. In the example shown in FIG. 2, the filter 42 is disposed on and fixed to the upper surface of one end (side region) of the holding member 44. The holding member 44 is made of a material that is more likely to transmit X-rays than the filter 42, for example, carbon, and is configured not to attenuate transmitted X-rays much and not to prevent the detector 20 from detecting the X-rays. To suppress occurrence of an artifact, the filter 42 is held by the holding member 44 so that the distances to the line sensors 21 and 22 can range 0.1 to 10 mm, inclusive.

The stopper 46 is a fixation member provided at one end of the holding member 44, and is a member for fixing the holding member 44 mounted with the filter 42 to the side surface 34 of the housing 30. The stopper 46 has a larger surface area than the opening 35 provided on the side surface 34 of the housing 30, thereby preventing the entire filter member 40 from entering the housing 30 during replacement of the filter member 40. The stopper 46 may be formed integrally with the holding member 44, or formed as a separated member. Fixation to the housing 30 is achieved by fixing the stopper 46 with screws or the like, for example.

The filter member 40 having such a configuration can position the filter 42 in the housing 30 so that, for example, the filter 42 can cover a region corresponding to a part (e.g., a half region in the width direction) of the slit 31 to attenuate a part of (half) the transmitted X-rays. More specifically, the filter member 40 can position and hold the filter 42 made of a linearly extending narrow width sheet so that an end (a right end in the diagram) in the width direction of the filter 42 can correspond to the region of the detector 20 between the line sensors 21 and 22 in the traveling direction of the transmitted X-rays. The filter member 40 is designed so that if a filter has the same shape (external shape) even with a different attenuation function (different in the thickness or material, for example), the filter can be disposed at the same position. Even when the filter member 40 is replaced with a filter member having a different type (thickness or material), the relative position with respect to the line sensors 21 and 22 is unchanged, which can facilitate replacement of the filter 42 (filter member 40).

As described above, in the X-ray detection device 10, according to the configuration described above, the line sensor 21 for which the scintillator 24 for low energy can detect X-rays in a low energy range having transmitted through the test subject S among the X-rays having emitted from the X-ray irradiator 5, as they are (without intervention of the filter 42), and can generate low energy image data. Meanwhile, the line sensor 22 for which the scintillator 25 for high energy can detect X-rays in a high energy range having transmitted through the test subject S and having been attenuated by the filter 42 among the X-rays having emitted from the X-ray irradiator 5, and can generate high energy image data. Furthermore, the X-ray detection device 10 adjusts the detection sensitivities using the filter member 40 disposed in the housing 30. Accordingly, without any change of the arrangement and the configuration outside of the housing 30 and without the scintillators 24 and 25 being scratched during filter replacement, the type of the filter 42 can be easily changed. Even in the X-ray detection device 10 where the line sensors are disposed close to each other, the detection sensitivities can be easily changed.

In the X-ray detection device 10, the opening 35 of the housing 30 has a larger area than the total area of the end surface of the filter 42 and the end surface of the holding member 44. Accordingly, the filter 42 and the like can be easily inserted into the housing 30. Consequently, when the detection sensitivities of the X-ray detection device 10 are changed for various energy bands, the filter member 40 of a different type can be easily replaced.

Furthermore, in the X-ray detection device 10, the filter member 40 includes the holding member 44 that holds the filter 42. The holding member 44 is made of a material that transmits more X-rays than the filter 42, for example, of carbon. Accordingly, the filter 42 can be securely disposed in the predetermined position in the housing 30, and prevention of appropriate X-ray detection due to attenuation of incident X-rays by the holding member 44 can be suppressed.

In the X-ray detection device 10, the filter member 40 includes the stopper 46 having a larger surface area than the opening 35, and the stopper 46 can be attached to the side surface 34 of the housing 30. Accordingly, the filter 42 of the filter member 40 can be more securely disposed at the predetermined position by the stopper 46. Furthermore, difficulty in replacement due to insertion of the entire filter member 40 of the different type into the housing 30 during replacement the filter member 40 can be prevented. Furthermore, as the stopper 46 has a larger area than the opening 35, the opening 35 is covered with the stopper 46 when the filter member 40 is arranged in the housing 30. Consequently, foreign matters (powder, dust, etc.) can be prevented from entering the inside of the housing 30 through the opening 35.

In the X-ray detection device 10, the filter member 40 has a substantially rectangular external shape in plan view, and the filter 42 is disposed on the end side of the member. Consequently, the filter 42 can typically be disposed at an appropriate position with respect to the detector 20 typically disposed at the center of the device.

Furthermore, in the X-ray detection device 10, the detector 20 includes: a first line sensor in which pixels having a first pixel width are one-dimensionally arranged; and a second line sensor in which pixels having a second pixel width are one-dimensionally arranged and which is disposed in parallel to the first line sensor with an interval narrower than the first and second pixel widths. In this case, the X-ray detection device 10 can be reduced in size, and the radiation in different energy ranges can be detected.

In the X-ray detection device 10, the distance between the filter 42 and the detector 20 ranges from 0.1 to 10 mm, inclusive. Consequently, occurrence of artifacts can be further suppressed.

In the X-ray detection device 10, the principal surface 32 of the housing 30 includes the slit 31 that can pass the X-rays entering the housing 30. The X-ray detection device 10 further includes the light shield film 50 that covers the slit 31. Consequently, attenuation of the X-rays entering the X-ray detection device 10 can be suppressed, and foreign matters (powder, dust, etc.) can be prevented from entering the inside of the housing 30 through the slit 31.

Figure 4:
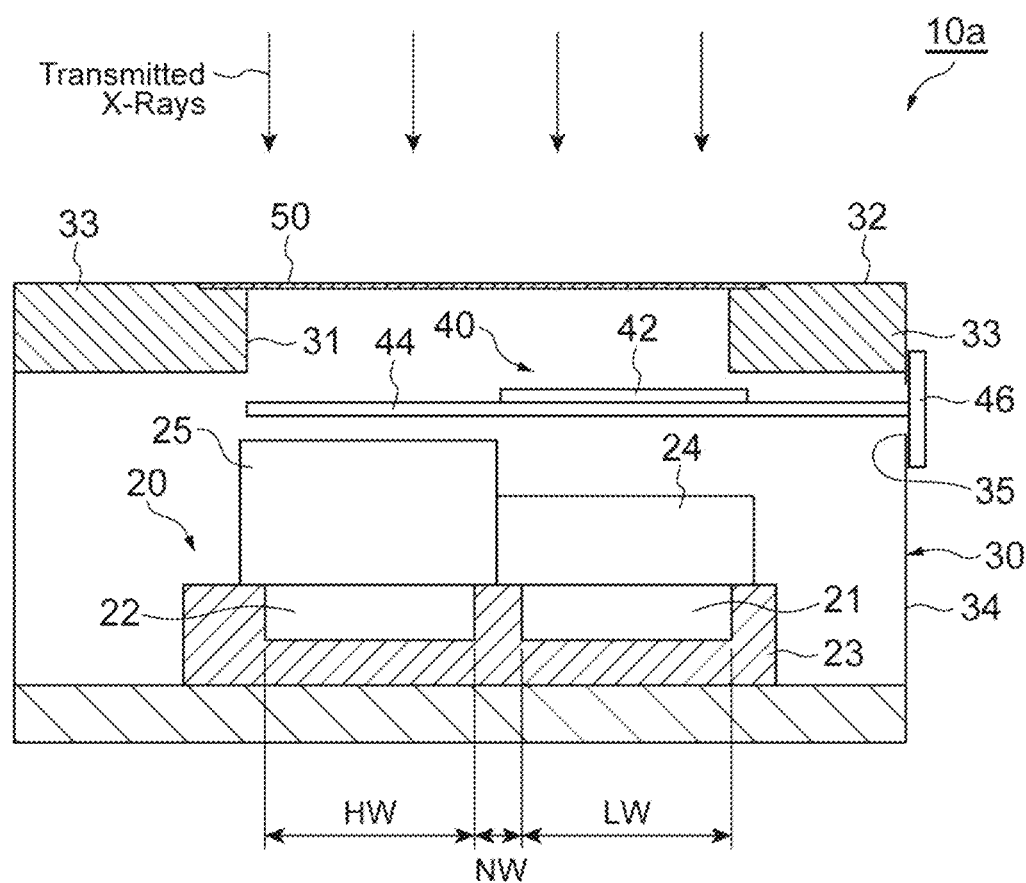
FIG. 4 is a sectional view schematically showing an X-ray detection device according to a second embodiment.
Figure 5:
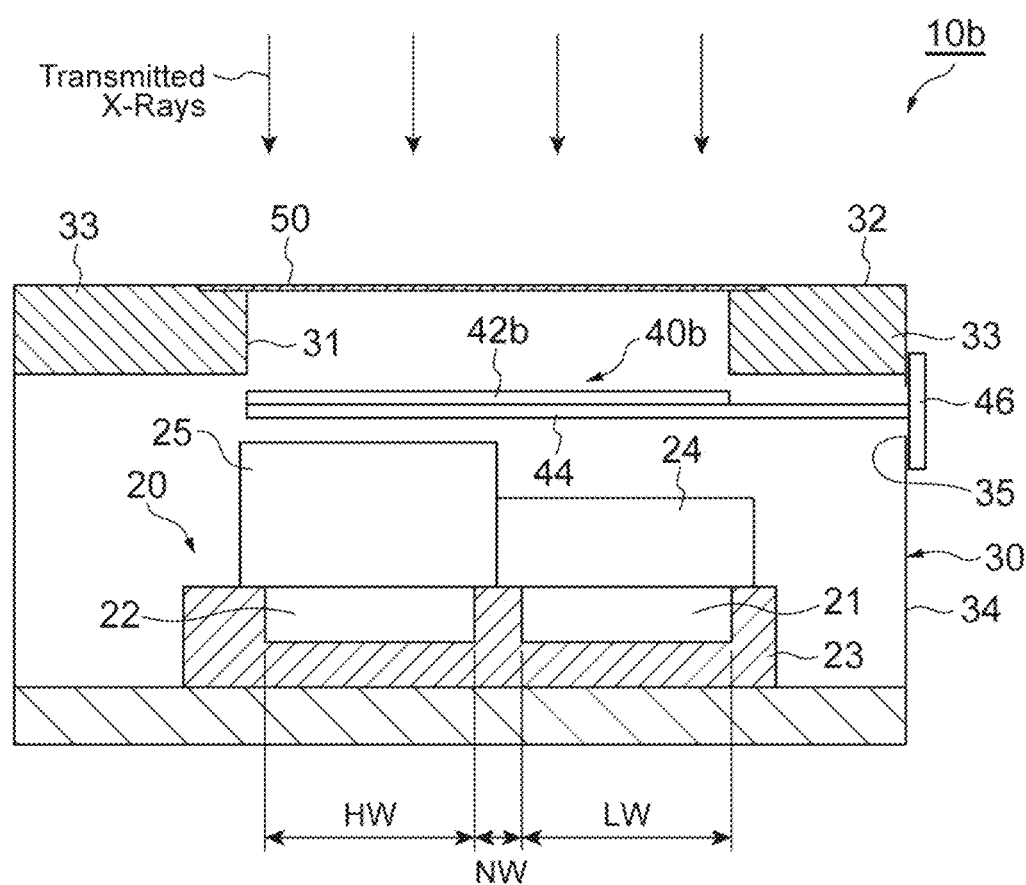
FIG. 5 is a sectional view schematically showing an X-ray detection device according to a third embodiment.
Figure 6:
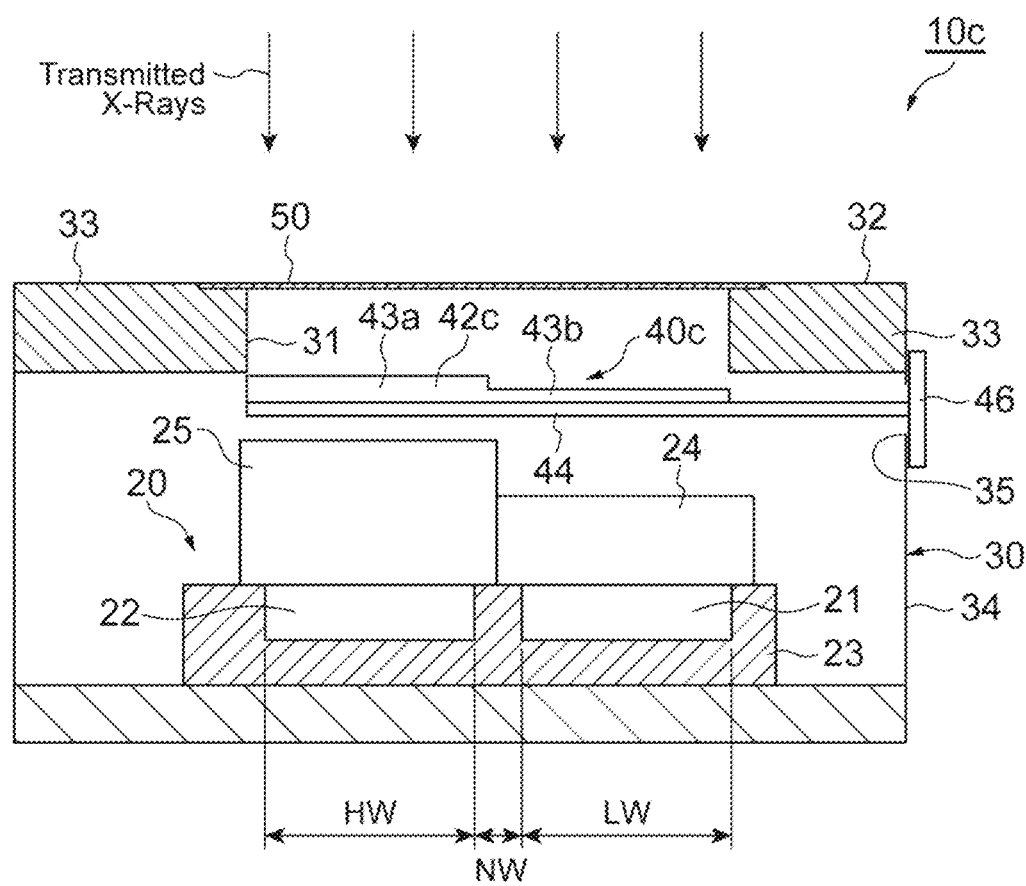
FIG. 6 is a sectional view schematically showing an X-ray detection device according to a fourth embodiment.
Figure 7:
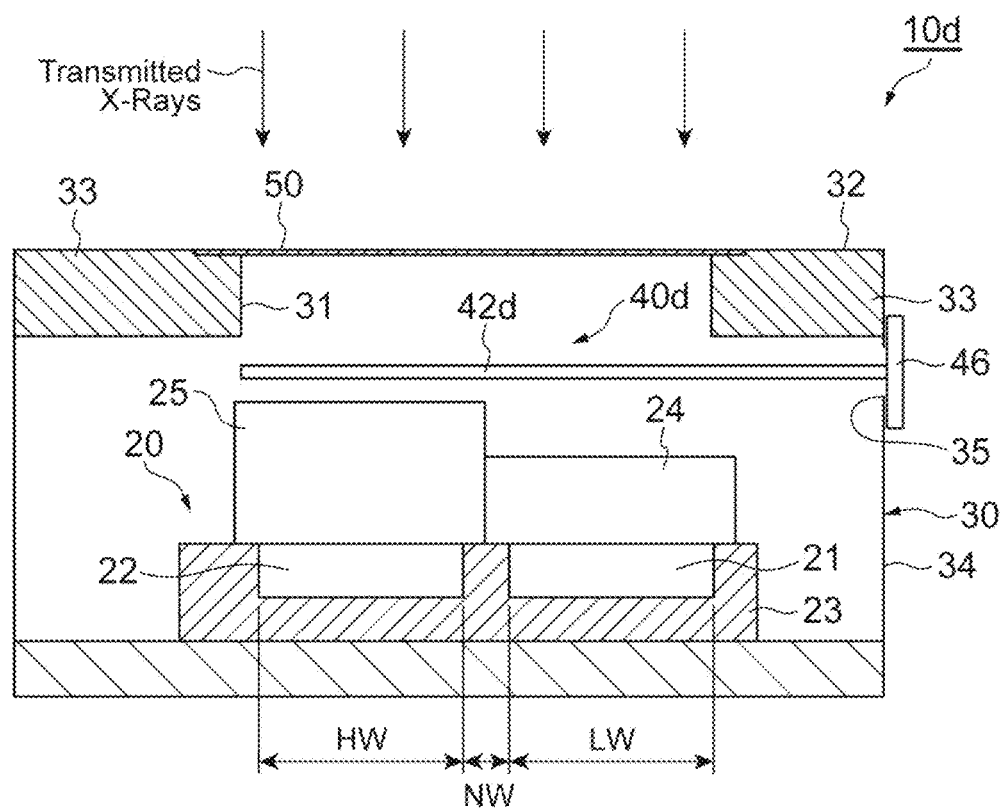
Figure 7:
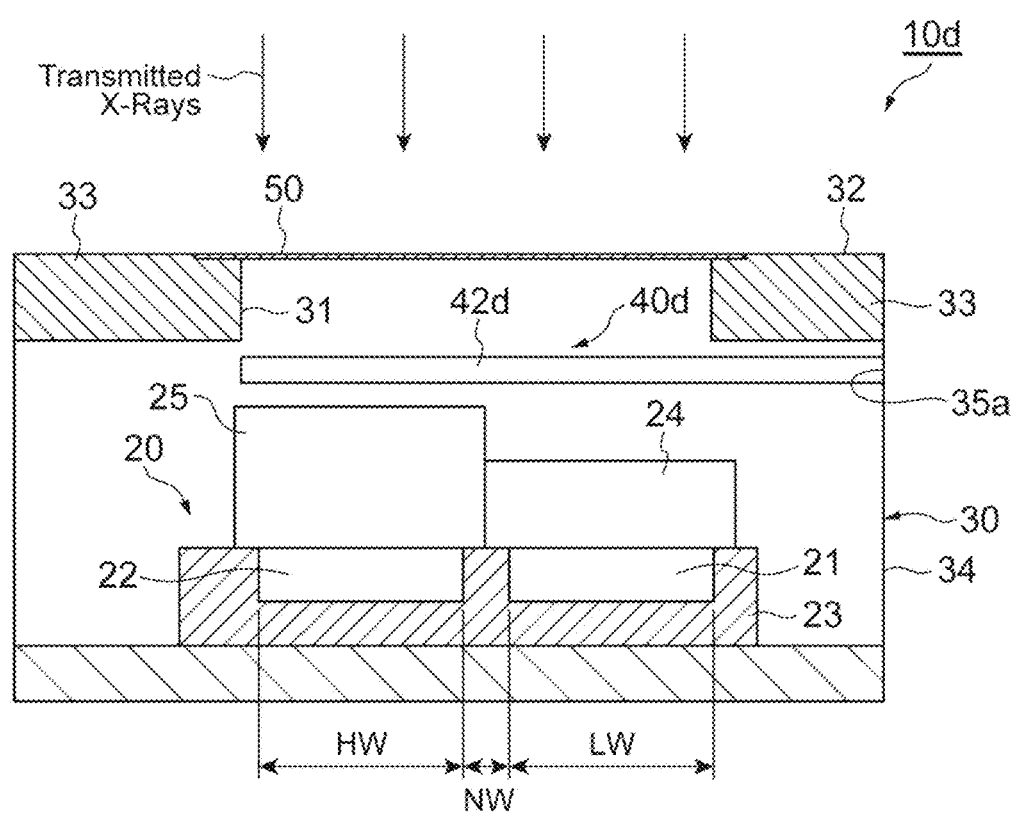
Figure 8:
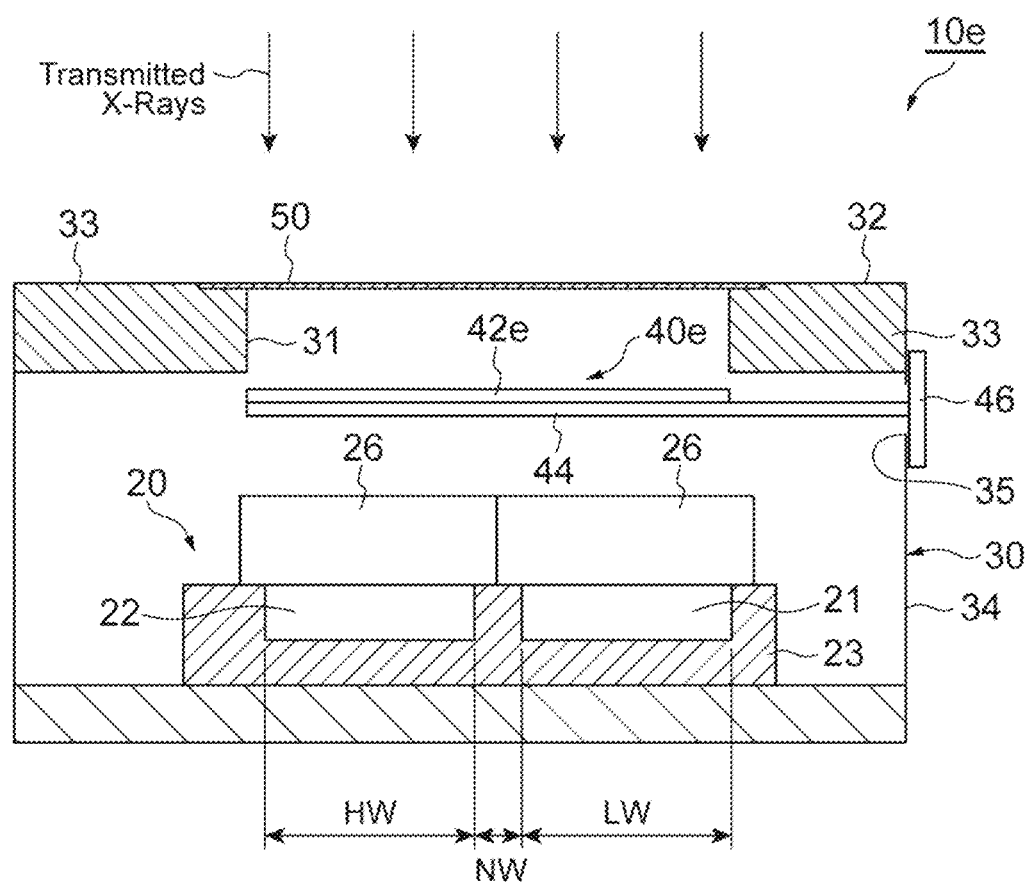
FIG. 8 is a sectional view schematically showing an X-ray detection device according to a sixth embodiment.
Figure 9:
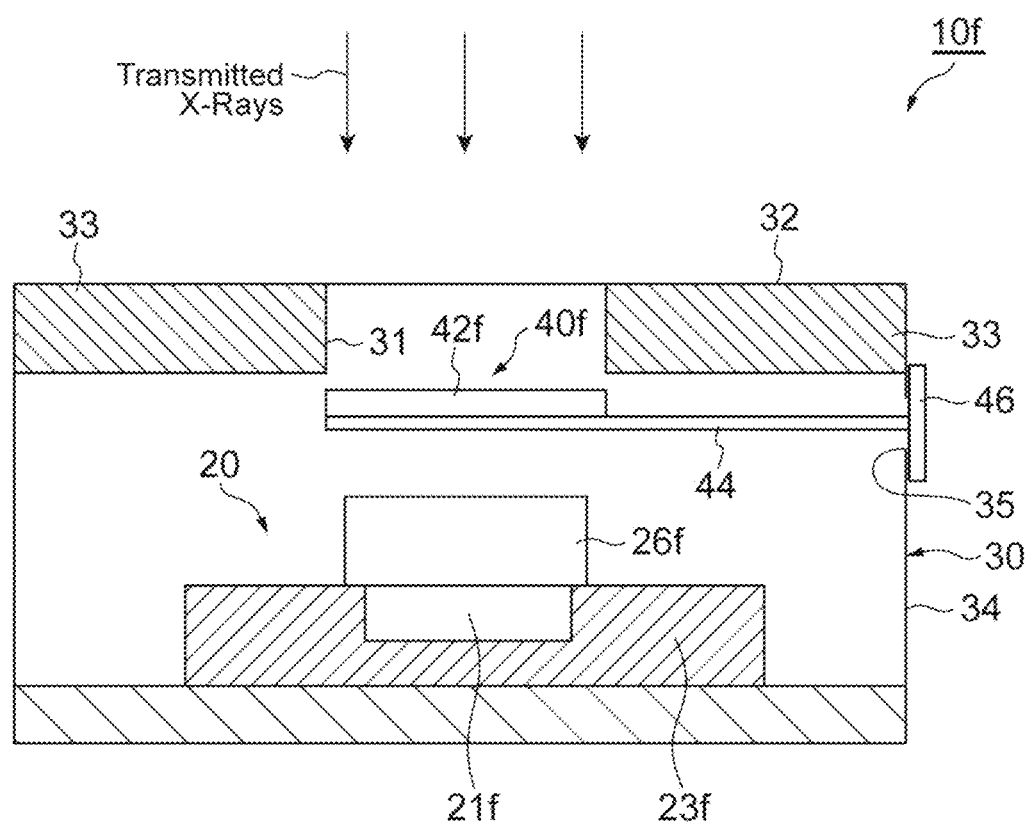
FIG. 9 is a sectional view schematically showing an X-ray detection device according to a seventh embodiment.

Next, referring to FIGS. 4 to 9, other embodiments (second to sixth embodiments) of the X-ray detection device 10 are described. FIG. 4 is a sectional view schematically showing the X-ray detection device according to the second embodiment. FIG. 5 is a sectional view schematically showing the X-ray detection device according to the third embodiment. FIG. 6 is a sectional view schematically showing the X-ray detection device according to the fourth embodiment. FIGS. 7(a) and 7(b) are sectional views schematically showing the X-ray detection device according to the fifth embodiment. FIG. 8 is a sectional view schematically showing the X-ray detection device according to the sixth embodiment. FIG. 9 is a sectional view schematically showing the X-ray detection device according to the seventh embodiment.

First, referring to FIG. 4, an X-ray detection device 10a according to the second embodiment is described. As shown in FIG. 4, the X-ray detection device 10a is different, in the arrangement site of the filter 42 in a filter member 40a, from the X-ray detection device 10 of the first embodiment. The other configuration points are analogous to those of the X-ray detection device 10. In the X-ray detection device 10a, the filter 42 of the filter member 40a is disposed to cover the line sensor 21 for which the scintillator 24 for low energy is disposed. In the X-ray detection device 10a, according to such a configuration, the line sensor 22 for which the scintillator 25 for high energy can detect X-rays in a high energy range having transmitted through the test subject S among the X-rays having emitted from the X-ray irradiator 5, as they are (without intervention of the filter 42), and can generate high energy image data. Meanwhile, the line sensor 21 for which the scintillator 24 for low energy can detect X-rays in a low energy range having transmitted through the test subject S and having been attenuated by the filter 42 among the X-rays having emitted from the X-ray irradiator 5, and can generate low energy image data. When the output of the line sensor 21 for low energy is saturated, for example, when the low energy side is saturated by increase in the output of the X-rays to secure S/N on the high energy side, the configuration described above can be adopted, for example.

Subsequently, referring to FIG. 5, an X-ray detection device 10b according to the third embodiment is described. As shown in FIG. 5, the X-ray detection device 10b is different, in the width of the filter 42b (the lateral direction in the diagram) in a filter member 40b, from the X-ray detection device 10 of the first embodiment. The other configuration points are analogous to those of the X-ray detection device 10. In the X-ray detection device 10b, a filter 42b for the filter member 40b is disposed to cover both the line sensor 21 for which the scintillator 24 for low energy is disposed and the line sensor 22 for which the scintillator 25 for high energy is disposed. In the X-ray detection device 10b, according to such a configuration, both the line sensor 21 for which the scintillator 24 for low energy is disposed and the line sensor 22 for which the scintillator 25 for high energy is disposed can detect X-rays in the respective energy ranges having transmitted through the test subject S and been attenuated by the filter 42b among the X-rays having emitted from the X-ray irradiator 5, and can generate high and low energy image data items. In a case of inspecting the inside of a substance having a relatively large weight, for example, in a case where metal foreign matters in 20 kg of wheat is to be detected and a low energy side is also allowed to perform detection with a high energy to some extent, the configuration described above can be adopted, for example.

Subsequently, referring to FIG. 6, an X-ray detection device 10c according to the fourth embodiment is described. As shown in FIG. 6, the X-ray detection device 10c is different, in the shape (variation in thickness) of the filter 42c in a filter member 40c, from the X-ray detection device 10b of the third embodiment. The other configuration points are analogous to those of the X-ray detection device 10b. As with in the X-ray detection device 10b, in the X-ray detection device 10c, a filter 42c for the filter member 40c is disposed to cover both the line sensor 21 for which the scintillator 24 for low energy is disposed and the line sensor 22 for which the scintillator 25 for high energy is disposed. However, in the X-ray detection device 10c, the filter 42c includes two regions 43a and 43b. The thickness in the first region 43a is larger than the thickness in the second region 43b. In the X-ray detection device 10c, according to such a configuration, both the line sensor 21 for which the scintillator 24 for low energy is disposed and the line sensor 22 for which the scintillator 25 for high energy is disposed can detect the X-rays in the respective energy ranges which have transmitted through the test subject S and been attenuated by the filter 42c among the X-rays having been emitted from the X-ray irradiator 5, and generate high and low energy image data items. Furthermore, the line sensor 22 for which the scintillator 25 for high energy is disposed can detect X-rays in a more attenuated high energy range than the line sensor 21 for which the scintillator 24 for low energy is disposed, and generate a high energy image data item. Such a configuration can obtain the image data items having the energy difference.

Subsequently, referring to FIGS. 7(a) and 7(b), an X-ray detection device 10d according to the fifth embodiment is described. As shown in FIG. 7(a), the X-ray detection device 10d is different from the X-ray detection device 10b in the third embodiment in that a filter member 40d does not include an independent holding member but a filter 42d also serves as the holding member instead. The other configuration points are analogous to those of the X-ray detection device 10b. As with in the X-ray detection device 10b, in the X-ray detection device 10d, the filter 42d for the filter member 40d is configured to cover both the line sensor 21 for which the scintillator 24 for low energy is disposed and the line sensor 22 for which the scintillator 25 for high energy is disposed. In the X-ray detection device 10d, both the line sensor 21 for which the scintillator 24 for low energy is disposed and the line sensor 22 for which the scintillator 25 for high energy is disposed can detect X-rays in the respective energy ranges having transmitted through the test subject S and been attenuated by the filter 42d among the X-rays having emitted from the X-ray irradiator 5, and can generate high and low energy image data items. As shown in FIG. 7(b), the X-ray detection device 10d may adopt a configuration where the thickness of the filter member 40d (filter 42d) is increased, the stopper 46 is omitted, and the end of the filter member 40d is inserted into the opening 35 provided on the side surface 34 of the housing 30 and is fixed. The area of the opening 35 in this case has a size that substantially coincides with the end surface of the filter 42d.

Subsequently, referring to FIG. 8, an X-ray detection device 10e according to the sixth embodiment is described. The X-ray detection device 10e is different from the dual-energy type X-ray detection devices 10 and 10a to 10d according to the first to fifth embodiments, but is a dual-line type X-ray detection device, and two scintillators 26 for the same energy band are disposed in parallel on the respective line sensors 21 and 22. As with in the X-ray detection device 10b of the third embodiment, in the X-ray detection device 10e, the width (in the lateral direction in the diagram) of a filter 42e in a filter member 40e is disposed so that the filter can cover both the two line sensors 21 and 22, as shown in FIG. 8. In the X-ray detection device 10e, according to such a configuration, the line sensors 21 and 22 for which the respective scintillators 26 for the same energy can detect X-rays in a predetermined energy range that have transmitted through the test subject S and been attenuated by the filter 42e among the X-rays having emitted from the X-ray irradiator 5, and can generate two energy image data items.

Subsequently, referring to FIG. 9, an X-ray detection device 10f according to the seventh embodiment is described. The X-ray detection device 10f is different from the X-ray detection devices 10 and 10a and 10e according to the first to sixth embodiments, and is what is called a single-line X-ray camera as shown in FIG. 9. As shown in FIG. 9, the X-ray detection device 10f includes one line sensor 21f as the detector 20 in a substrate 23f, and has a configuration where one scintillator 26f is disposed on the line sensor 21f. In the X-ray detection device 10f, a filter 42f of a filter member 40f is disposed in such a way as to cover the entire line sensor 21f. According to such a configuration, as with the embodiments described above, the single type X-ray camera also adjusts the detection sensitivities using the filter member 40f disposed in the housing 30. Accordingly, without any change of the arrangement and the configuration outside of the housing 30 and without the scintillator 26f being scratched during filter replacement, the type of the filter 42f can be easily changed. Even in the X-ray detection device 10f, the detection sensitivity can be easily changed.

Figure 10:
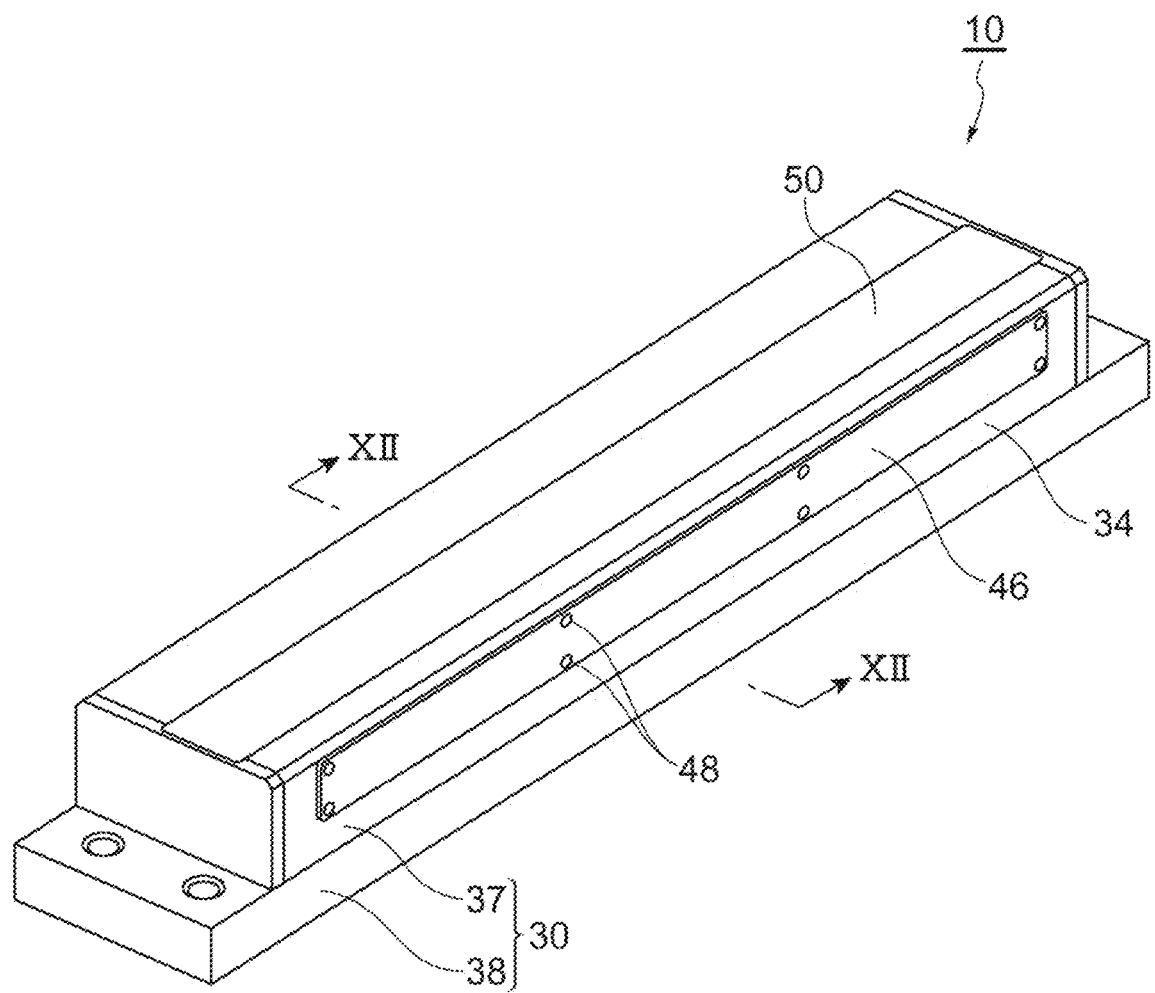
FIG. 10 is a perspective view showing an example of the X-ray detection device according to this embodiment.
Figure 11:
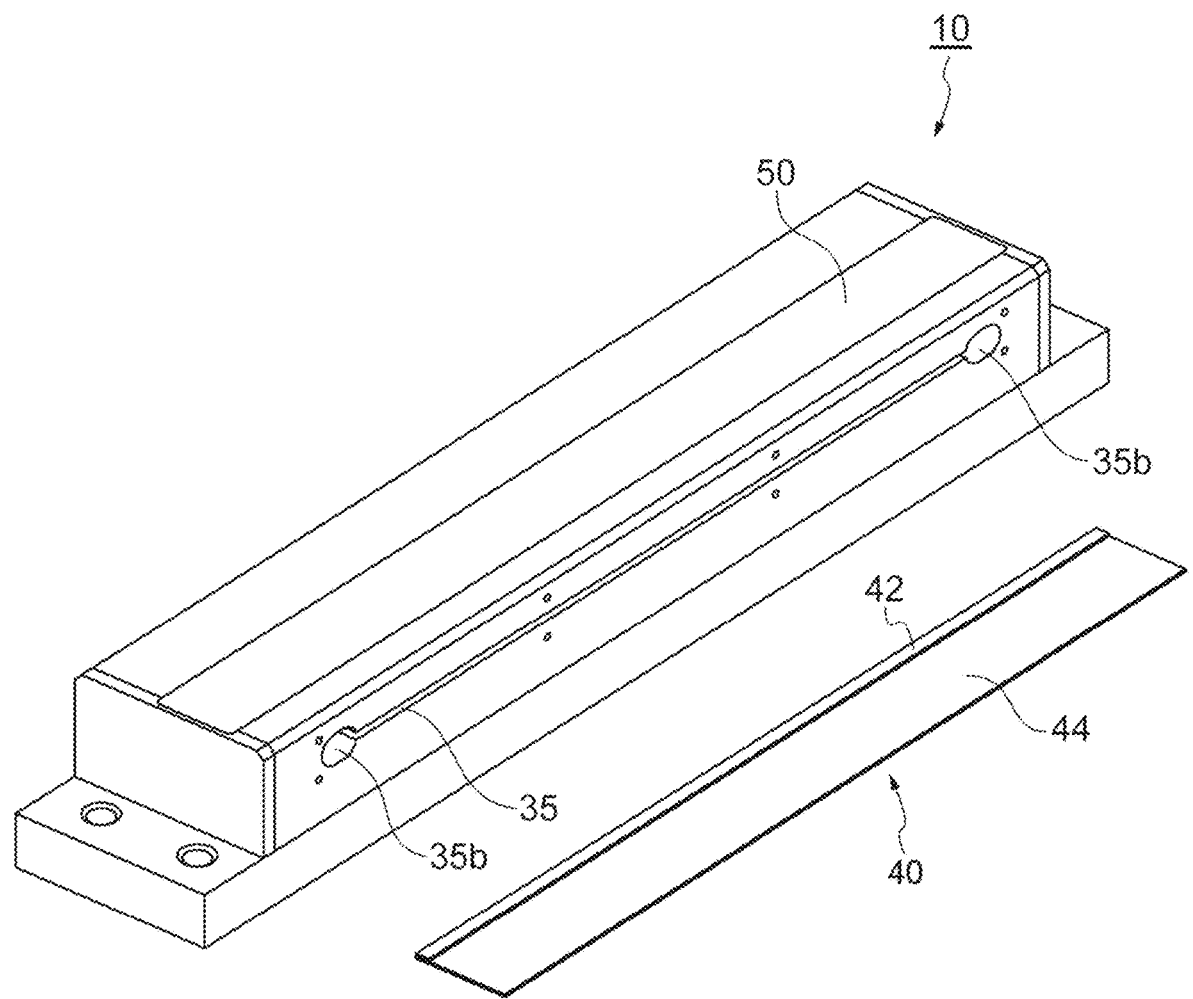
FIG. 11 is a perspective view showing a state where a filter member is inserted into an opening on a side surface of the X-ray detection device shown in FIG. 10.
Figure 12:
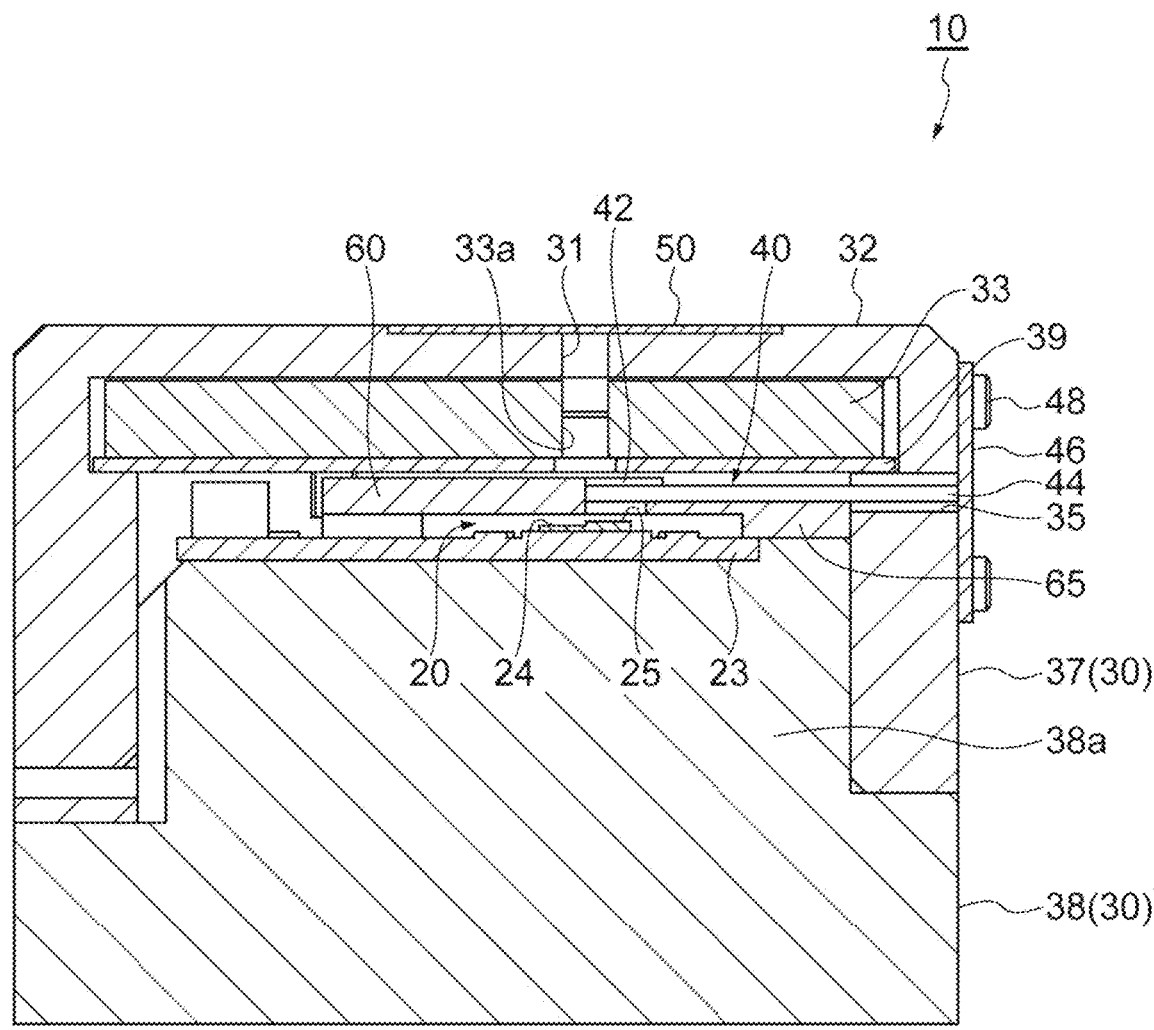
FIG. 12 is a sectional view taken along line XII-XII showing an example of the X-ray detection device shown in FIG. 10.

Referring to FIGS. 10 to 12, an example of the X-ray detection device 10 is described. FIG. 10 is a perspective view showing an example of the X-ray detection device according to this embodiment. FIG. 11 is a perspective view showing a state where a filter member is inserted into an opening on a side surface of the X-ray detection device shown in FIG. 10. FIG. 12 is a sectional view taken along line XII-XII showing the example of the X-ray detection device shown in FIG. 10.

As described above, the X-ray detection device 10 includes the detector 20, the housing 30, the filter member 40, and the light shield film 50. As shown in FIGS. 10 to 12, the housing 30 includes an upper housing 37 that has an internal space, and a lower housing 38 that is planar and includes a protrusion 38a at the center. The protrusion 38a of the lower housing 38 is fitted into the inside of the upper housing 37, thereby allowing the upper housing 37 and the lower housing 38 to be fitted with each other in order to prevent particles and the like from entering the inside of the housing 30. The upper housing 37 and the lower housing 38 are, for example, made of aluminum or the like. The substrate 23 of the detector 20 is disposed on the upper surface of the protrusion 38a of the lower housing 38, and the line sensors 21 and 22 (see FIG. 2) are formed on the substrate 23. The scintillator 24 is disposed on the line sensor 21. The scintillator 25 is disposed on the line sensor 22. In the example shown in FIG. 12, the arrangement of the line sensors 21 and 22 (scintillators 24 and 25) is inverted from that in the example shown in FIG. 2. The arrangement can be appropriately changed.

In the housing 30, a planar shield member 33 for preventing X-rays emitted from the X-ray irradiator 5 from entering the inside as they are is provided above the detector 20. The shield member 33 is provided with a slit 33a at the center. The slit 33a has a length and width corresponding to those of the slit 31, and is formed so that the X-rays emitted from the X-ray irradiator 5 can reach the detector 20. A support plate 39 for supporting the shield member 33 is disposed under the shield member 33. The support plate 39 is attached to a dent on the inner surface of the upper housing 37 of the housing 30. The support plate 39 is made of stainless steel or the like, for example. A slit analogous to the slit 33a is provided also for the support plate 39.

As shown in FIG. 12, in the housing 30, the thin-plate-shaped filter member 40 is disposed in a state of being apart from the detector 20, and the filter 42 is formed on the upper surface of a distal end region of the holding member 44. Furthermore, a plate-shaped positioning member 60 that is in contact with the distal end of the filter member 40 and accurately positions the filter member 40 so that this member cannot further enter the inside of the housing 30 is disposed in the housing 30 (see FIGS. 13(a) and 13(b)). In the example, shown in FIGS. 12, 13(a) and 13(b), the positioning member 60 is disposed in such a way as to cover one scintillator 24 (line sensor 21) in a top view, and performs positioning so that the filter 42 of the filter member 40 can only cover the other scintillator 25 (line sensor 22). According to such a configuration, the X-rays having transmitted through the test subject S are divided into transmitted X-rays that are attenuated by the filter 42 and X-rays that are not attenuated by the filter 42, and the transmitted X-rays having not been attenuated enter the scintillator 24 for low energy, and the transmitted X-rays having been attenuated enter the scintillator 25 for high energy. The positioning member 60 is made of a material that can more easily transmit X-rays than the filter 42 and the like, for example, of carbon, resin, metal or the like.

In addition to the positioning member 60, a slide member 65 is further provided in the housing 30. The slide member 65 is a member that guides the filter member 40 when the filter member 40 is inserted into the housing 30, and is disposed below the region where the filter member 40 is inserted, for example. The slide member 65 prevents the filter member 40 from being bent when the thin-plate-shaped filter member 40 is inserted and removed, and also prevents the filter member 40 from coming into contact with the scintillators 24 and 25 and the like. After the filter member 40 is inserted into the housing 30, the slide member 65 supports a large part of the thin-plate-shaped filter member 40 except the region corresponding to the filter 42 from the lower side to prevent the filter member 40 from being bent downward. Accordingly, the filter 42 of the filter member 40 is further securely positioned not to deviate from a position for covering the scintillator 25, for example.

In the example shown in FIG. 12, the stopper 46 is formed as a component separate from the holding member 44, blocks the opening 35 on the side surface 34 after the filter 42 and the like are inserted into the housing 30, and this member is fixed to the side surface 34 of the housing 30 with screws 48. The shape of the opening 35 formed on the side surface 34 is not specifically limited only if the opening has an area slightly larger than the both end surfaces of the filter 42 and the holding member 44. For example, as shown in FIG. 11, larger end surfaces 35b and 35b having substantially circular shapes at both the ends are formed, thereby allowing the filter member 40 to be easily inserted into and removed from the housing 30.

Here, a method of adjusting the X-ray detection device 10 described above is briefly described. As described above, in the X-ray detection device 10, the filter 42 is automatically positioned to be disposed above the line sensor 22 (scintillator 25) of the detector 20 in the event that the filter member 40 is inserted into the inside through the opening 35 on the side surface 34 of the housing 30 and is moved to the position defined by the positioning member 60. First, a plurality of filter members 40 that have the same shape but different attenuations (different in thickness and material) are prepared. The plurality of filter members 40 are sequentially inserted into the housing 30, and held at a predetermined position by the positioning member 60, the slide member 65 and the like, and transmitted X-rays in each of the cases are detected. According to the results of the detected X-rays, the optimal filter member that can more correctly detect the test subject S to be inspected and foreign matters, that is, can obtain a desired energy difference and S/N ratio, is selected from among the filter members 40. According to such a method, the filter member (filter 42) suitable for detection of the specific test subject S can be easily selected and changed. Note that the filter member selected as described above is held and fixed at a predetermined position in the housing 30 as it is and is used for the X-ray detection device 10, thereby allowing the X-ray detection device 10 having the optimal detection sensitivity to be easily manufactured.

As with in the above description, also in the X-ray detection device 10 shown in FIGS. 10 to 12, the line sensor 21 for which the scintillator 24 for low energy is disposed can detect X-rays in the low energy range that have transmitted through the test subject S among the X-rays having emitted from the X-ray irradiator 5 as they are and can generate the low energy image data item, and the line sensor 22 for which the scintillator 25 for high energy is disposed can detect X-rays in the high energy range that have transmitted through the test subject S and been attenuated by the filter 42 and can generate the high energy image data item. Furthermore, the X-ray detection device 10 adjusts the detection sensitivities using the filter member 40 disposed in the housing 30. Accordingly, as the slide member 65 and the like are disposed, the type of the filter 42 can be easily changed without any change of the arrangement (for example, on the principal surface 32) and the configuration outside of the housing 30 and without the scintillators 24 and 25 being scratched during filter replacement. As a result, according to the X-ray detection device 10, also in the X-ray detection device 10 where the line sensors are disposed close to each other, the detection sensitivities can be easily changed to various energy bands.

Figure 13:
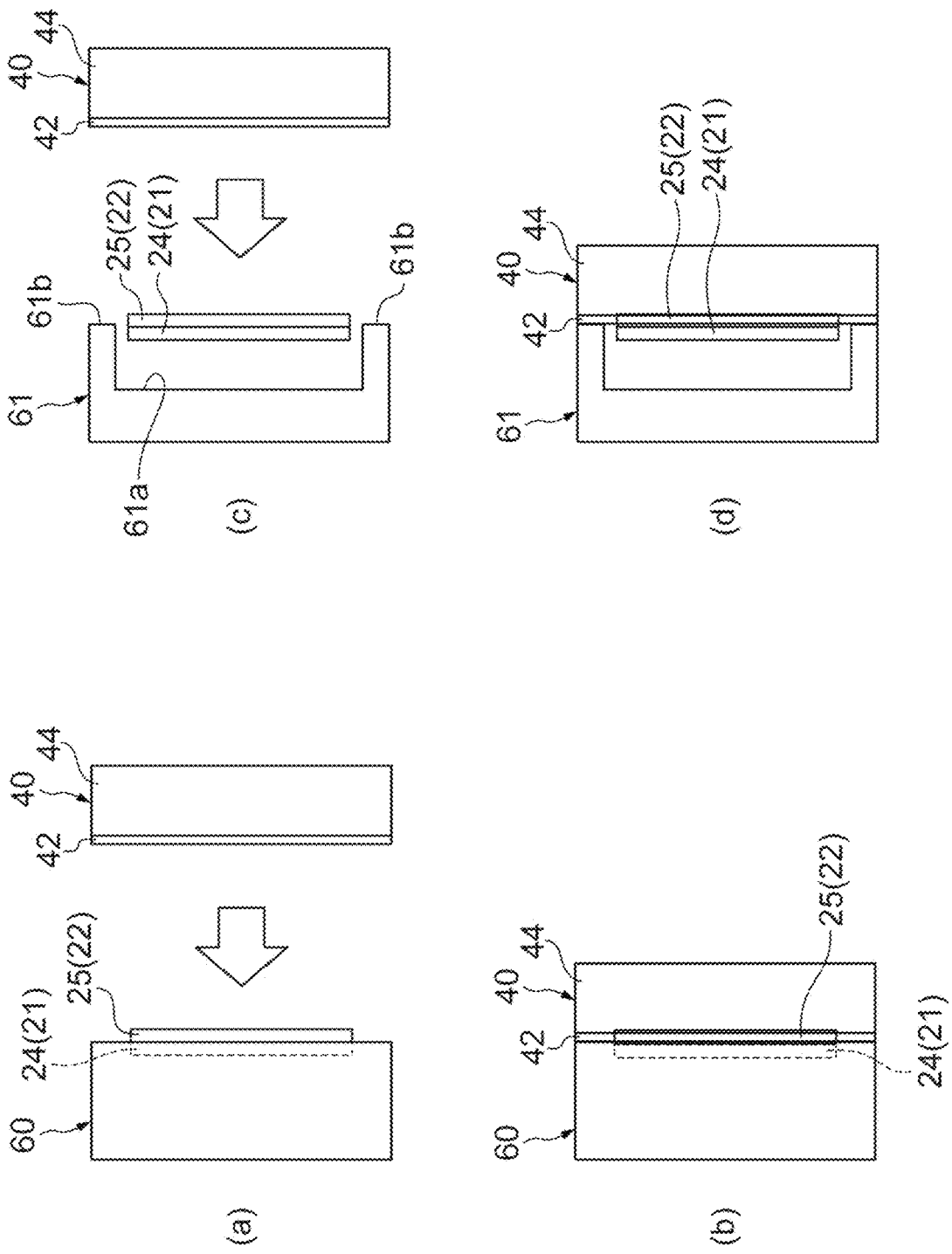
FIG. 13 is a plan view showing positioning of the filter member using a positioning member in the X-ray detection device shown in FIG. 10, (a) shows an example of the positioning member and the filter member, (b) shows a state where the filter member in (a) is positioned by the positioning member, (c) shows another example of the positioning member and the filter member, and (d) shows a state where the filter member in (c) is positioned by the positioning member.

The X-ray detection device 10 further includes the positioning member 60 for positioning the filter member 40 in the housing 30 so that the filter 42 can cover a predetermined region (for example, the line sensor 22) of the detector 20. Accordingly, even if the detector 20 is forming to have a minute configuration, the filter 42 can be further accurately and further securely disposed in an appropriate position with respect to the detector 20. Any of various forms can be adopted as such a positioning member 60. For example, as shown in FIGS. 13(c) and 13(d), a positioning member 61 may be adopted where a depression 61a is provided at a part, and the opposite ends 61b and 61b are in contact with the side of the filter member 40. Even with the positioning member 61, the filter member 40 can be securely positioned by the opposite ends 61b and 61b.

Figure 14:
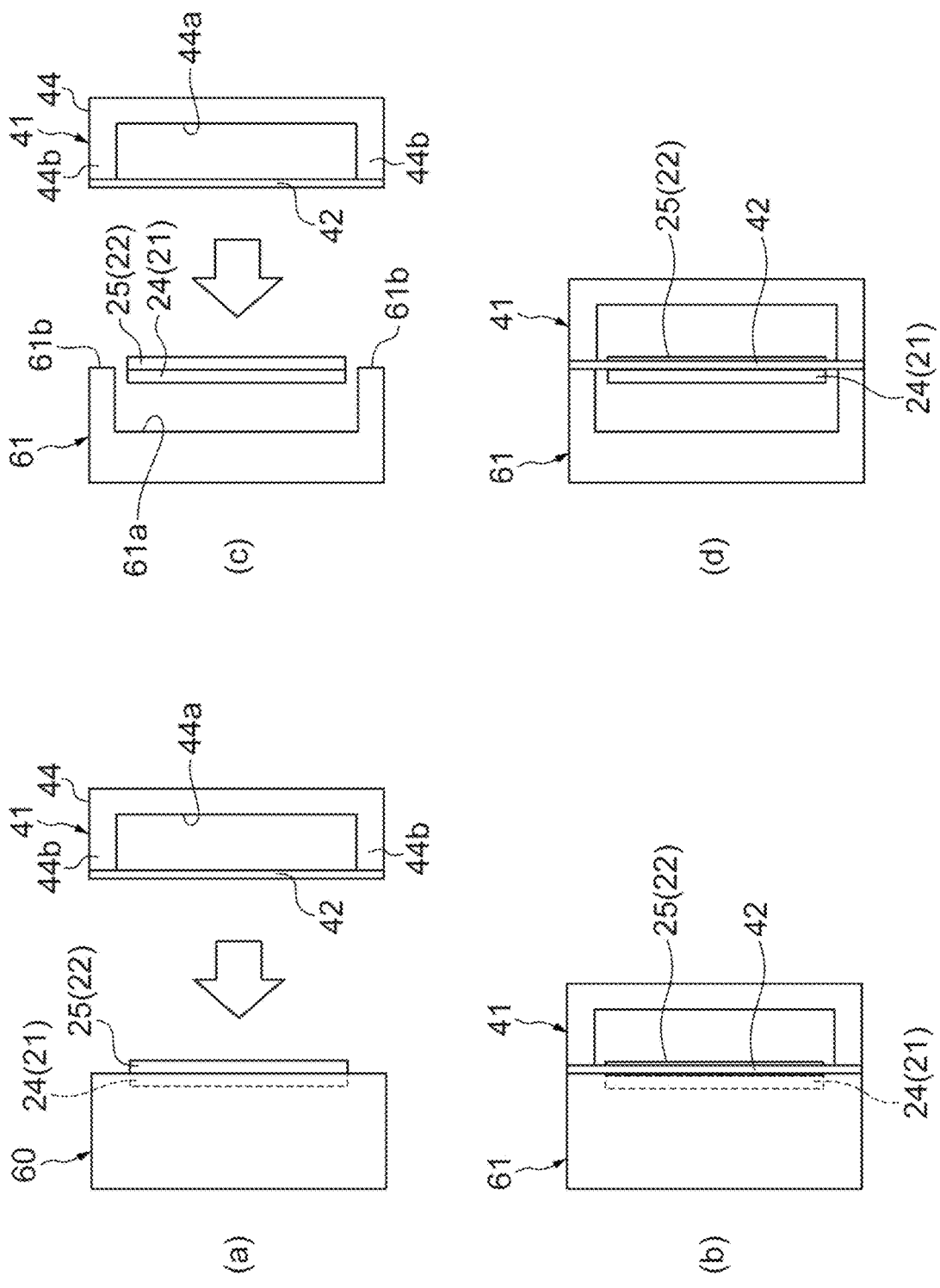
FIG. 14 is a plan view showing positioning of the filter member using the positioning member in the X-ray detection device shown in FIG. 10, (a) shows still another example of the positioning member and the filter member, (b) shows a state where the filter member in (a) is positioned by the positioning member, (c) shows another example of the positioning member and the filter member, and (d) shows a state where the filter member in (c) is positioned by the positioning member.

A shape shown in FIG. 14 can be adopted as the form of positioning. For example, as shown in FIGS. 14(a) and 14(b), if a configuration where the holding member 44 of the filter member 41 has a depression 44a and the filter 42 is held only by the opposite ends 44b and 44b is adopted, it may be configured such that the opposite ends 44b and 44b and the side of the filter member 40 are in contact with the positioning member 60, and the filter 42 is positioned. Furthermore, shown in FIGS. 14(c) and 14(d), the holding member 44 of the filter member 40 may have the depression 44a while the positioning member 61 may have the depression 61a, and positioning may be achieved by the opposite ends 44b and 44b and 61b and 61b being in contact with each other.

The preferred embodiments of the present invention have thus been described in detail. The present invention is not limited to the above embodiments. Various modifications can be made. For example, in the embodiments described above, the scintillator is used to convert the radiation into visible light or the like. Alternatively, without use of the scintillator, a direct conversion type radiation detector (e.g., silicon semiconductor, amorphous selenium (a-Se) semiconductor, cadmium telluride (CdTe) semiconductor, cadmium zinc telluride (CdZnTe) semiconductor, etc.) may be used as the line sensor. In this case, there is no need to provide the scintillator separately, thereby allowing the number of components to be reduced.

Figure 15:
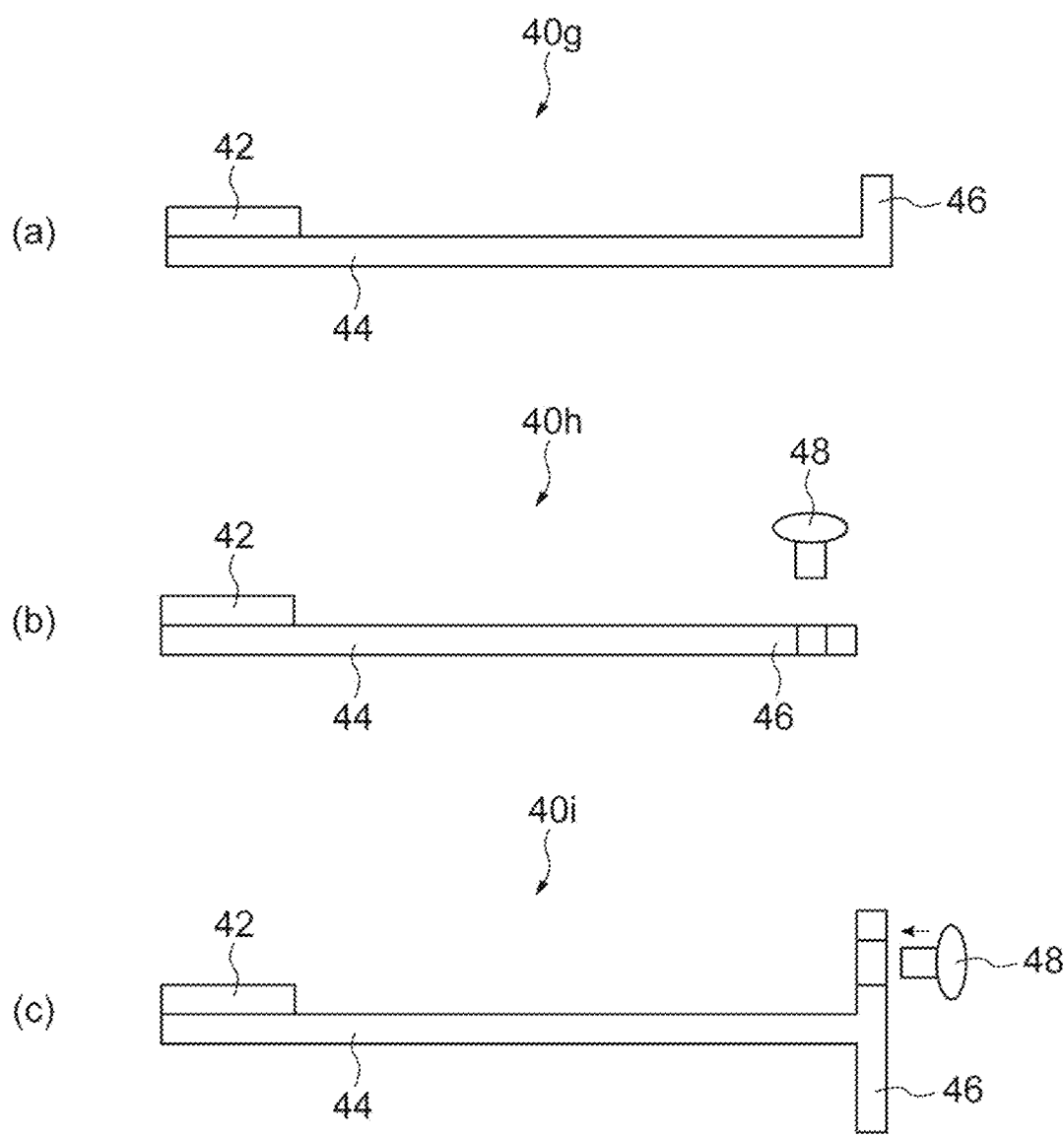
FIG. 15 shows a modification example of a filter member used in an X-ray detection device.

The example in the embodiment shown in FIGS. 10 to 12 shows the mode where the stopper 46 of the filter member 40 is a separate component, and the stopper 46 is attached to the side surface 34 of the housing 30 with the screws 48. However, the configuration is not limited thereto. For example, as shown in FIG. 15(a), the holding member 44 and the stopper 46 may be integrally formed to be a filter member 40g having an L-shape as a whole in a sectional view. As shown in FIG. 15(b), the holding member 44 and the stopper 46 may be linearly integrated to be a filter member 40h where the stopper 46 is fixed to the housing 30 with the screws 48. Further alternatively, as shown in FIG. 15(c), the holding member 44 and the stopper 46 may be integrally formed to be a filter member 40 having a T-shape as a whole in a sectional view.

INDUSTRIAL APPLICABILITY

The present invention is applicable to a radiation detection device that detects radiation having transmitted through a test subject, a radiation inspection system, and a method for adjusting the radiation detection device.

REFERENCE SIGNS LIST

1 . . . X-ray inspection system (radiation inspection system), 3 . . . Belt conveyer (conveyer machine), 5 . . . X-ray irradiator (radiation source), 10, 10a to 10f . . . X-ray detection device (radiation detection device), 20 . . . Detector, 21, 21f, 22 . . . Line sensor, 24 to 26 . . . Scintillator, 30 . . . Housing, 31 . . . Slit, 32 . . . Principal surface, 34 . . . Side surface, 35 . . . Opening, 40, 40a to 40i, 41 . . . Filter member, 42, 42b to 42f . . . Filter, 43a, 43b . . . Region, 44 . . . Holding member, 46 . . . Stopper, 50 . . . Light shield film, 60, 61 . . . Positioning member.

The invention claimed is:

1. A radiation detection device comprising;
a filter member having a filter configured to attenuate at least a part of an incident radiation;
a detector configured to detect the radiation with at least a part thereof having been attenuated by the filter; and
a housing that places the detector therein, wherein the housing comprises a principal surface including a part through which the radiation passes, and a side surface including an opening extending in a direction intersecting with the principal surface and allowing the filter to be inserted therethrough,
wherein the filter is disposed in the housing so as to cover at least a part of the detector in a state of being apart from the detector.

2. The radiation detection device according to claim 1, wherein the opening of the housing has a larger area than an end surface of the filter.

3. The radiation detection device according to claim 1, wherein the filter member comprises a holding member that holds the filter, and the holding member is made of a material transmitting more radiation than the filter.

4. The radiation detection device according to claim 1, wherein the filter member comprises a stopper having a larger surface area than the opening, and the stopper is attached to the side surface of the housing.

5. The radiation detection device according to claim 1, wherein the filter member has a substantially rectangular external shape in plan view, and the filter is disposed in its side region.

6. The radiation detection device according to claim 1, further comprising
a positioning member that positions the filter member in the housing so that the filter can cover a predetermined region of the detector.

7. The radiation detection device according to claim 6, wherein the positioning member is in contact with an entire or a part of a side of the filter member to position the filter.

8. The radiation detection device according to claim 1, wherein the detector comprises:
a first line sensor including pixels having a first pixel width, the pixels being one-dimensionally arranged; and
a second line sensor including pixels having a second pixel width, the pixels being one-dimensionally arranged, the second line sensor being disposed in parallel to the first line sensor with an interval narrower than the first and second pixel widths.

9. The radiation detection device according to claim 8, wherein the detector further comprises a first scintillator disposed above the first line sensor, and a second scintillator disposed above the second line sensor.

10. The radiation detection device according to claim 8, wherein the filter covers one of the first and second line sensors.

11. The radiation detection device according to claim 8, wherein the filter covers both the first and second line sensors, the filter includes a first region covering the first line sensor, and a second region covering the second line sensor, and a thickness of the first region and a thickness of the second region are identical to or different from each other.

12. The radiation detection device according to claim 8, wherein the first line sensor and the second line sensor are direct conversion type radiation detectors.

13. The radiation detection device according to claim 1, wherein a distance between the filter and the detector ranges from 0.1 to 10 mm, inclusive.

14. The radiation detection device according to claim 1, wherein the principal surface of the housing includes a slit through which the radiation having entered the housing passes, and
wherein the radiation detection device further comprises a light shield film covering the slit.

15. A radiation inspection system, comprising:
a radiation source that irradiates the test subject with radiation;
the radiation detection device according to claim 1; and
a conveyer machine that conveys the test subject in a direction intersecting with a radiation direction of the radiation by the radiation source.

16. A method for adjusting the radiation detection device according to claim 1, comprising:
preparing members including a plurality of filters having different attenuation functions, as the filter member;
sequentially inserting the plurality of filters through the opening of the housing into an inside, holding the filter at a predetermined position, and detecting the radiation; and
selecting an optimal filter member among the filters according to results of the detected radiation.

17. A method for manufacturing the radiation detection device adjusted by the adjustment method according to claim 16, further comprising
inserting the optimal filter member selected by the selecting into the inside through the opening of the housing, and holding and fixing the filter member at a predetermined position.

* * * * *